United States Patent [19]
Yasuda

[11] Patent Number: 4,807,048
[45] Date of Patent: Feb. 21, 1989

[54] FREQUENCY CONVERTER FOR VIDEO TAPE RECORDER

[75] Inventor: Yuzo Yasuda, Ohta, Japan

[73] Assignee: Sanyo Electric Co., Ltd., Osaka, Japan

[21] Appl. No.: 72,202

[22] Filed: Jul. 8, 1987

[30] Foreign Application Priority Data

Jul. 17, 1986 [JP] Japan ................................. 61-168449
Jul. 18, 1986 [JP] Japan ................................. 61-170633

[51] Int. Cl.$^4$ .......................... H04N 9/79; H04N 9/89
[52] U.S. Cl. ..................................... 358/310; 358/320; 358/324; 358/326
[58] Field of Search ................ 358/310, 320, 324, 326, 358/327, 328, 11, 40, 335, 337, 316

[56] References Cited

U.S. PATENT DOCUMENTS 4,490,749 12/1984 Hirota ................................. 358/320
4,524,380 6/1985 Shibata et al. ....................... 358/316

FOREIGN PATENT DOCUMENTS 51-36089 10/1976 Japan .

OTHER PUBLICATIONS

Semiconductor Handbook, "Monolithic Bipolar Integrated Circuit", Edited by Sanyo Electric O., Ltd., 1985, pp. 909 and 910.

Primary Examiner—L. T. Hix
Assistant Examiner—David M. Gray
Attorney, Agent, or Firm—Armstrong, Nikaido, Marmelstein & Kubovcik

[57] ABSTRACT

A frequency converter for a VTR extracts a carrier chrominance signal $f_S$ of 3.58 MHz in a video signal by an BPF 102 and applies the same to a first frequency converter 103. On the other hand, a signal having a frequency of 4.21 MHz which is the sum of a frequency 3.58 MHz of the carrier chrominance signal $f_S$ and the frequency 629 KHz of a low-frequency converted chrominance signal $f_{SL}$ is applied from a VCO 117. The first frequency converter 103 outputs signals $(f_S+f_{SL})\pm f_S$ responsive to the signal of 4.21 MHz and an LPF 112 passes signal $f_{SL}$ of 629 KHz. On the other hand, an output of the VCO 117, together with an output of an VXO 114 which is in synchronization with a burst signal in the signal $f_S$, is applied to a second frequency converter 118. The circuit 118 outputs signals $f_S\pm(f_S+f_{SL})$. An LPF 120 passes the signal $f_{SL}$ of 629 KHz. A phase comparator circuit 121 compares phases of the signal $f_{SL}$ and a horizontal synchronizing signal $f_H$ and controls an oscillating output signal of the VCO 117 in accordance with the phase difference.

17 Claims, 6 Drawing Sheets 4,807,048

FREQUENCY CONVERTER FOR VIDEO TAPE RECORDER

BACKGROUND OF THE INVENTION

1. Field of the Invention

The present invention relates to a frequency converter and more particularly, to a frequency converter for a video tape recorder (VTR), which can be implemented as an integrated circuit.

2. Description of the Prior Art

Conventionally, a VTR, particularly a home VTR, has been adapted such that a carrier chrominance signal of 3.58 MHz in a video signal is generally converted into a low-frequency signal of 629 KHz and recorded on a tape, and the reproduced low-frequency converted chrominance signal of 629 KHz is reconverted into the carrier chrominance signal of 3.58 MHz at the time of reproduction.

A frequency converter for such a conventional VTR is disclosed in, for example, Japanese Patent Publication No. 36089/1975, Japanese Publication "Semiconductor Hand book, Mololithic Bipolar Integrated Circuit Edited by Sanyo Electric Co., Ltd., 1985" issued in Mar. 20, 1985, pp. 910, and U.S. Pat. No. 4,524,380 (particularly, FIG. 23 and the description thereof) issued in June 18, 1985.

FIG. 1 is a circuit diagram showing an example of a low-frequency converter for low-frequency converting a carrier chrominance signal of 3.58 MHz into a chrominance signal of 629 KHz at the time of recording in the conventional home VTR, which is proposed in Japanese Utility Model Application No. 174,364 filed in Nov. 13, 1985 by the inventor.

Referring now to FIG. 1, description is made on a structure of a low-frequency converter for the conventional VTR.

In FIG. 1, a color video signal is inputted to a terminal 1, and a carrier chrominance signal $f_s$ of 3.58 MHz therein is extracted by a band-pass filter (BPF) 2 and applied to a first frequency converter 3 and a burst gate circuit 4. The burst gate circuit 4 extracts a burst signal in the applied carrier chrominance signal and applies the same to a phase comparator circuit 5. The phase comparator circuit 5 compares phases of a continuous wave $f_s$ of 3.58 MHz applied from a crystal voltage-controlled oscillator (VXO) 6 and the above described burst signal applied from the burst gate circuit 4, generates a DC voltage corresponding to the difference therebetween and applies the same to the VXO 6, and controls an oscillation frequency of the VXO 6 so that an oscillating output signal of the VXO 6 is in synchronization with the burst signal. As a result, an oscillating output signal $f_S$ which is in synchronization with the burst signal is applied to a second frequency converter 7. On the other hand, a horizontal synchronizing signal $f_H$ in the video signal is applied to a phase locked loop (PLL) frequency multiplier 9 from a terminal 8. Accordingly, the PLL frequency multiplier 9 outputs a signal $f_{SL}$ (629 KHz) having a frequency which is constant times (40 times) a frequency of the above described horizontal synchronizing signal and applies the same to the second frequency converter 7 through a phase shift circuit 10. The second frequency converter 7 generates signals of $f_S \pm f_{SL}$ in response to the output signal $f_S$ of the VXO 6 and the output $f_{SL}$ of the phase shift circuit 10 and applies the same to a band-pass filter (BPF) 11. The BPF 11 extracts only a signal component of the $f_S + f_{SL}$ in the applied signals and applies the same to a first frequency converter 3. As a result, the first frequency converter 3 generates signals of $f_S \pm (f_S + f_{SL})$ in response to the output signal $f_S$ from the BPF2 and the output $f_S + f_{SL}$ of the BPF 11 and applies the same to a low-pass filter (LPF) 12. The LPF 12 extracts only a difference component, that is, a signal component of $f_{SL}$ in the applied signals and outputs the same through a terminal 13. More specifically, according to the circuit shown in FIG. 1, the carrier chrominance signal $f_S$ of 3.58 MHz inputted to the terminal 1 is low-frequency converted into the chrominance signal $f_{SL}$ of 629 KHz and outputted from the terminal 13.

As described in the foregoing, the signal of $f_S + f_{SL}$ (=4.21 MHz) (the output of the BPF 11) which is in synchronization with the burst signal in the carrier chrominance signal and the horizontal synchronizing signal in the video signal is produced, whereby the carrier chrominance signal is low-frequency converted, in order to form a precise low-frequency converted chrominance signal $f_{SL}$ corresponding to 40 $f_H$ in the input video signal. More specifically, at the time of reproduction of the VTR, a fluctuation component of the time base such as jitter is generally included in a luminance signal and the low-frequency converted chrominance signal due to expansion and contraction of a tape and rotational irregularity of a video head. The fluctuation component of the time base can be removed based on the fluctuation component included in the horizontal synchronizing signal and the low-frequency converted carrier chrominance signal in the reproduced signal. Actually, there may not be necessarily sufficient correlation between the frequencies of a carrier chrominance signal and the horizontal synchronizing signal in a video signal to be recorded. When such a video signal is recorded and reproduced, there is a possibility that displacement and fluctuation of the carrier chrominance signal is compensated for too much or too less. In addition, in a VTR of a VHS system, when the low-frequency converted chrominance signal is recorded, a phase of the above described low-frequency converted chrominance signal is shifted by 90° every 1 H (H is a horizontal synchronizing period), to reduce crosstalk between adjacent tracks. More specifically, when the phase of the low-frequency converted chrominance signal is shifted by 90°, a frequency spectrum of the low-frequency converted chrominance signal between adjacent tracks is interleaved by $\frac{1}{2} \cdot f_H$, so that crosstalk can be reduced. Thus, it is desirable that the above described low-frequency converted chrominance signal is precisely in synchronization with the horizontal synchronizing signal. Thus, in the structure shown in FIG. 1, the low-frequency converted chrominance signal including the same fluctuation component as that of the horizontal synchronizing signal in the recorded signal is obtained, so that the above described problem can be solved.

FIG. 2 is a circuit diagram showing an example of the frequency converter for converting the low-frequency converted chrominance signal of 629 KHz recorded on the tape into the carrier chrominance signal of 3.58 MHz at the time of reproduction in the conventional VTR.

In FIG. 2, a frequency modulated (FM) luminance signal and a low-frequency converted carrier chrominance signal reproduced from the tape are inputted to a terminal 21, and only the low-frequency converted chrominance signal of 629 KHz therein is extracted by an LPF 22 and applied to a first frequency converter 23. On the other hand, an oscillating output signal of a voltage controlled oscillator (VCO) 24 generated at a free running frequency of approximately 160 $f_H$ ($f_H$: 15.74 KHz) is applied to a side lock preventing circuit 26 utilizing as a reference signal the reproduced horizontal synchronizing signal $f_H$ inputted from a terminal 25, where the frequencies of the oscillating output signal and the reference signal are compared. A correcting voltage is fed back to the VCO 24 from the side lock preventing circuit 26. In addition, the oscillating output signal 160 $f_H$ of the VCO 24 is frequency-divided into ¼ by a frequency divider 27, so that a signal of $f_{SL} = 40\ f_H$ is applied to a second frequency converter 29 through a phase shift circuit 28. On the other hand, an oscillation circuit 30 outputs an oscillating output signal $f_S$ of 3.58 MHz and applies the same to the second frequency converter 29 and a phase comparator circuit 35. The second frequency converter 29 generates signals of $f_S \pm f_{SL}$ in response to an output $f_{SL}$ of the phase shift circuit 28 and the output $f_S$ of the oscillation circuit 30 and applies the same to a BPF 31. The BPF 31 extracts only a signal component of $f_S + f_{SL}$ in the applied signals and applies the same to the first frequency converter 23. As a result, the first frequency converter 23 generates signals of $(f_S + f_{SL}) \pm f_{SL}$ in response to the output signal $f_{SL}$ of the LPF 22 and an output signal $f_S + f_{SL}$ of the BPF 31 and applies the same to a BPF 32. The BPF 32 extracts only a difference component, that is, a signal component of $f_S$ in the applied signals, outputs the component through a terminal 33 and applies the same to a burst gate circuit 34. The burst gate circuit 34 extracts a burst signal in the applied carrier chrominance signal $f_S$ and applies the same to a phase comparator circuit 35. The phase comparator circuit 35 compares phases of the signal $f_S$ of 3.58 MHz applied from the oscillation circuit 30 and the above described burst signal applied from the burst gate circuit 34, generates a voltage corresponding to a difference phase therebetween and applies the same to the VCO 24, and controls the oscillation frequency of the VCO 24 so that the burst signal is in synchronization with the phase of the signal from the oscillation circuit 30.

As described in the foregoing, according to the circuit shown in FIG. 2, the low-frequency converted chrominance signal of 629 KHz inputted to the terminal 21 is converted into the carrier chrominance signal of 3.58 MHz and outputted from the terminal 33.

However, in the circuit shown in FIG. 1, the frequencies of two output signals of the second frequency converter 7 are relatively approximate values, that is, $f_S + f_{SL} = 4.21$ MHz and $f_S - f_{SL} = 2.95$ MHz, so that the BPF 11 having high Q is required for the determination. In addition, in a second circuit, the frequencies of the two output signals of the second frequency converter 29 are also approximate values, that is, 4.21 MHz and 2.95 MHz, so that the BPF 31 having high Q is required for the determination. Since it is generally difficult to contain such a band pass filter having high Q in an IC, the number of parts externally provided is increased and the number of pins is increased, so that the frequency converter can not be implemented as an IC.

SUMMARY OF THE INVENTION

Therefore, a primary object of the present invention is to provide a frequency converter for a VTR which can be implemented as an integrated circuit and having a simple circuit structure.

Briefly stated, the present invention is directed to a frequency converter for a VTR for converting a carrier chrominance signal in a video signal into a low-frequency signal, comprising means for extracting a carrier chrominance signal having a first frequency including a burst signal from the video signal and supplying the same, voltage controlled oscillator means for supplying a signal having a third frequency which is the sum of the first frequency and a second frequency which is predetermined times a frequency of a horizontal synchronizing signal in the video signal, first frequency converting means responsive to the supplied carrier chrominance signal having the first frequency and the signal having the third frequency supplied from the voltage controlled oscillator means for supplying a chrominance signal which is low-frequency converted into the second frequency, oscillator means for supplying a signal having a predetermined frequency which is in synchronization with a burst signal in the carrier chrominance signal having the first frequency, second frequency converting means responsive to the signal having the third frequency supplied from the voltage controlled oscillator means and a signal having a predetermined frequency supplied from the oscillator means for supplying a signal including a signal component having the second frequency, and first phase comparing means for comparing phases of an output of the second frequency converting means and the horizontal synchronizing signal in the video signal and controlling the voltage controlled oscillator means so that the phases coincide with each other.

In accordance with another aspect of the present invention, a frequency converter for a VTR for converting a low-frequency converted chrominance signal recorded on a tape into a carrier chrominance signal comprises means for extracting a low-frequency converted chrominance signal recorded on the tape having a first frequency which is predetermined times a frequency of a reproduced horizontal synchronizing signal and supplying the same, voltage controlled oscillator means for supplying a signal having a third frequency which is the sum of the first frequency and a second frequency which is higher than the first frequency, first frequency converting means responsive to the supplied low-frequency converted chrominance signal having the first frequency and the signal having the third frequency supplied from the voltage controlled oscillator means for supplying a carrier chrominance signal, as frequency-converted into the second frequency, including a burst signal, oscillator means for supplying a signal having a predetermined frequency associated with the second frequency, second frequency converting means responsive to the signal having the third frequency supplied from the voltage controlled oscillator means and the signal having a predetermined frequency supplied from the oscillator means for supplying a signal including a signal component having the first frequency, phase comparing means for comparing phases of the burst signal in the carrier chrominance signal having the second frequency and the signal having a predetermined frequency supplied from the oscillator means and controlling the voltage controlled oscillator means so that the phases coincide with each other, and frequency controlling means for comparing the frequencies of an output of the second frequency converting means and the reproduced horizontal synchronizing signal and controlling the voltage controlled oscillator means based on the difference therebetween.

In accordance with still another aspect of the present invention, a frequency converter for a VTR comprises means for extracting a carrier chrominance signal having a first frequency including a burst signal from a video signal and supplying the same, means for extracting a low-frequency converted chrominance signal recorded on the tape having a second frequency which is predetermined times a frequency of a horizontal synchronizing signal in the video signal and lower than the first frequency and supplying the same, first selecting means for selecting the carrier chrominance signal having the first frequency at the time of recording and selecting the low-frequency converted chrominance signal having the second frequency at the time of reproduction, voltage controlled oscillator means for supplying a signal having a third frequency which is the sum of the first frequency and the second frequency, first frequency converting means responsive to the chrominance signal selected by the first selecting means and the signal having the third frequency supplied from the voltage controlled oscillator means for supplying the chrominance signal which is low-frequency converted into the second frequency at the time of recording and supplying the carrier chrominance signal which is frequency converted into the first frequency at the time of reproduction, first oscillator means for generating a signal having a predetermined frequency which is in synchronization with the burst signal having the first frequency, second oscillator means for supplying a signal having a predetermined frequency associated with the first frequency, second selecting means for selecting an output of the first oscillator means at the time of recording and selecting an output of the second oscillator means at the time of reproduction, second frequency converting means responsive to the signal having the third frequency supplied from the voltage controlled oscillator means and the signal selected by the second selecting means for supplying a signal including a signal component having the second frequency, first phase comparing means for comparing phases of an output of the second frequency converting means and the horizontal synchronizing signal in the video signal and supplying an output to control the voltage controlled oscillator means so that the phases coincide with each other, second phase comparing means for comparing phases of the burst signal in the carrier chrominance signal having the first frequency supplied from the first frequency converting means at the time of reproduction and a signal having a predetermined frequency supplied from the second oscillator means and supplying an output to control the voltage controlled oscillator means so that the phases coincide with each other, frequency controlling means for comparing frequencies of the output of the second frequency converting means and the horizontal synchronizing signal and supplying the output to control the voltage controlled oscillator means based on the difference therebetween, and third selecting means for applying the output of the first phase comparing means to the voltage controlled oscillator means a the time of recording and applying the outputs of the second phase comparing means and the frequency controlling means to the voltage controlled oscillator means at the time of reproduction.

A principal advantage of the present invention is that since the frequency is converted using voltage controlled oscillator means which oscillates at a frequency which is the sum of frequencies of a carrier chrominance signal and a low-frequency converted chrominance signal, a BPF having high Q need not be inserted in the preceding stage of a frequency converter.

Another advantage of the present invention is that since an expensive BPF having high Q need not be used, the number of parts externally provided and the number of pins can be reduced when the frequency converter is implemented as an integrated circuit and manufacturing cost can be reduced.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
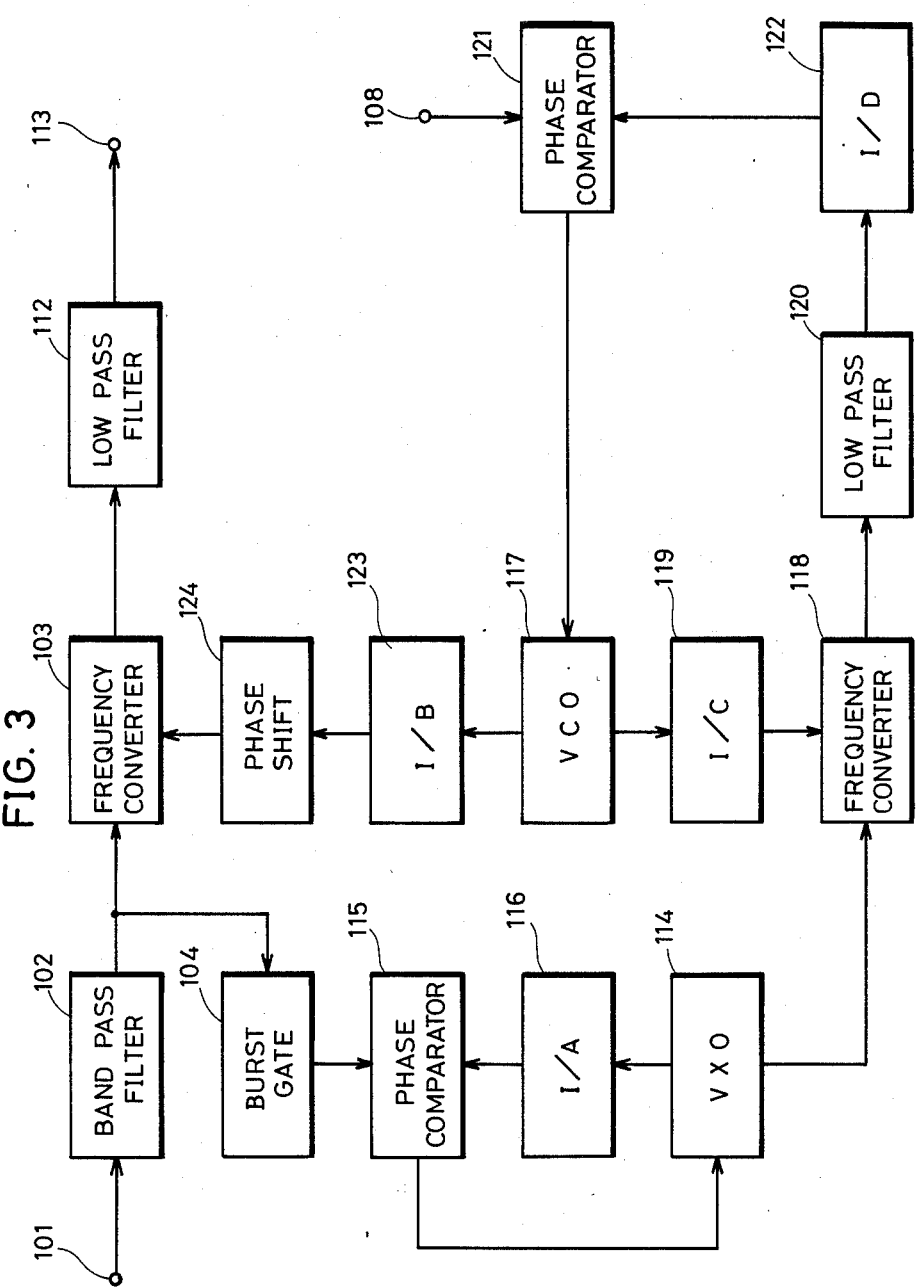
FIG. 3 is a circuit diagram showing a frequency converter for a VTR according to a first embodiment of the present invention.

FIG. 3 is a block diagram showing a frequency converter for a VTR according to a first embodiment of the present invention. The frequency converter shown in FIG. 3 coverts a carrier chrominance signal of 3.58 MHz into a low-frequency converted chrominance signal of 629 KHz at the time of recording.

Figure 1:
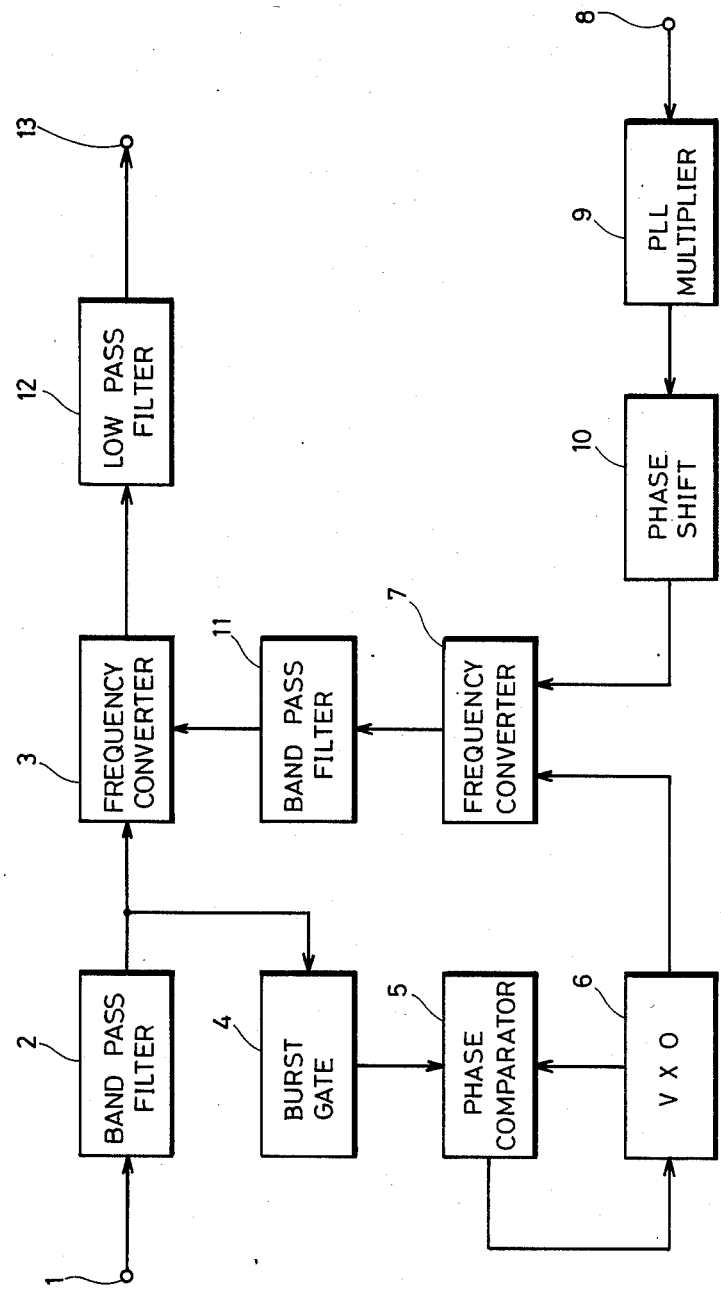
FIG. 1 is a circuit diagram showing an example of a low-frequency converter for low-frequency converting a carrier chrominance signal of 3.58 MHz into a chrominance signal of 629 KHz at the time of recording in a conventional VTR.

In FIG. 3, a color video signal is inputted to a terminal 101, and a carrier chrominance signal $f_S$ of 3.58 MHz therein is extracted by a BPF 102 and applied to a first frequency converter 103 and a burst gate circuit 104. The burst gate circuit 104 extracts a burst signal in the carrier chrominance signal $f_S$ and applies the same to a first phase comparator circuit 115. On the other hand, an oscillating output signal $A \cdot f_S$ of a VXO 114 which oscillates at a frequency which is A (A is an integer) times a frequency 3.58 MHz of the carrier chrominance signal $f_S$ is applied to the first phase comparator circuit 115 through a 1/A frequency divider 116. The first phase comparator circuit 115 outputs a DC voltage corresponding to the phase difference in response to the burst signal from the burst gate circuit 104 and an output signal from the 1/A frequency divider 116 and applies the same to the VXO 114, and controls the oscillating output signal of the VXO 114. The controlled oscillating output signal of the VXO 114 is applied to a second frequency converter 118. In addition, a VCO 117 oscillates at a frequency which is B (B is an integer) times a frequency which is the sum of the frequency 3.58 MHz of the carrier chrominance signal $f_S$ and the frequency 629 KHz of the low-frequency converted chrominance signal $f_{SL}$, of which an oscillating output signal $B \cdot (f_S + f_{SL})$ is applied to the second frequency converter 118 through a 1/C (C is an integer) frequency divider 119. Furthermore, the second frequency converter 118 applies two output signals $A \cdot f_S \pm (B/C) \cdot (f_S + f_{SL})$ in response to input signals $A \cdot f_S$ and $(B/C) \cdot (f_S + f_{SL})$. An LPF 120 extracts a signal of $A \cdot f_S - (B/C) \cdot (f_S + f_{SL})$ in the output signals and applies the same to a 1/D (D is an integer) frequency divider 122. Additionally, a horizontal synchronizing signal in the video signal and an output of the LPF 120 are applied to a second phase comparing circuit 121 through a terminal 108 and the 1/D frequency divider 122, respectively. The second phase comparator circuit 121 controls the oscillating output signal of the VCO 117 in response to a DC voltage corresponding to the phase difference between the input signals. An output of the VCO 117 is applied to the first frequency converter 103 through a 1/B frequency divider 123 and a phase shift circuit 124. An output of the first frequency converter 103 is applied to an LPF 112 in the same manner as the conventional example shown in FIG. 1, from which a low-frequency converted chrominance signal $f_{SL}$ is extracted and outputted through an output terminal 113.

Description is now made on operation according to the first embodiment shown in FIG. 3.

The carrier chrominance signal $f_S$ in the color video signal inputted to the terminal 101 is applied to the first frequency converter 103 and the burst gate circuit 104 through the BPF 102. The burst gate circuit 104 passes the burst signal in the applied carrier chrominance signal $f_S$ and applies the same to the first phase comparator circuit 115. On the other hand, the oscillating output signal $A \cdot f_S$ of the VXO 114 which oscillates at the frequency which is A times the frequency of the carrier chrominance signal $f_S$ is frequency-divided by the 1/A frequency divider 116 to be the signal $f_S$ and applied to the first phase comparator circuit 115. The first phase comparator circuit 115 compares phases of the above described burst signal and the signal $f_S$, so that a DC voltage corresponding to the phase difference is fed back to the VXO 114. As a result, the oscillating output signal $A \cdot f_S$ which is in synchronization with a signal having a frequency which is A times the frequency of the burst signal is supplied from the VXO 114 and applied to the second frequency converter 118.

On the other hand, the oscillating output signal $B \cdot (f_S + f_{SL})$ of the VCO 117 which oscillates at the frequency which is B times the frequency which is the sum of the frequencies of the carrier chrominance signal $f_S$ and the low-frequency converted chrominance signal $f_{SL}$ is frequency-divided by the 1/C frequency divider 119 to be a signal $(B/C) \cdot (f_S + f_{SL})$ and applied to the second frequency converter 118. Since signals having a frequency of the sum and a frequency of the difference in the applied two signals appear in an output of the second frequency converter 118, the signal of $A \cdot f_S \pm (B/C) \cdot (f_S + f_{SL})$ generates in the output. Assuming that the frequency dividing ratio of the frequency converter is A=1, B=C=4, D=40, two signals of $f_S \pm (f_S + f_{SL})$ are generated as the output signals of the second frequency converter 118, and a difference component therein, that is, the signal $f_{SL}$ is extracted through the LPF 120 and applied to the 1/D frequency divider 122. The 1/D frequency divider 122 applies a signal of $(1/40) \cdot f_{SL}$ (=15.74 KHz) to the second phase comparator circuit 121, which compares the phases of the signal and the horizontal synchronizing signal serving as a reference signal. A DC voltage corresponding to the phase difference is fed back to the VCO 117. As a result, the VCO 117 is controlled such that phases of two input signals of the second phase comparator circuit 121 coincide with each other. An oscillating output signal $4 \cdot (f_S + f_{SL})$ of the VCO 117 is applied to the ¼ frequency divider 123 and the phase shift circuit 124. When a signal of $4 \cdot (f_S + f_{SL}) = 4 \times 4.21$ MHz is applied, the frequency divider 123 and the phase shift circuit 124 frequency-divides the signal into ¼ and at the same time, generates output signals (4.21 MHz) which are out of phase by 90°. Thus, signals $(f_S + f_{SL}) + f_S$ appear in an output of the first frequency converter 103, and only the signal $f_{SL}$ of a difference component is extracted by the LPF 112 and outputted through the terminal 113. More specifically, according to the circuit shown in FIG. 3, the carrier chrominance signal $f_S$ of 3.58 MHz inputted to the terminal 101 is low-frequency converted into the chrominance signal $f_{SL}$ of 629 KHz and outputted from the terminal 113.

Figure 4:
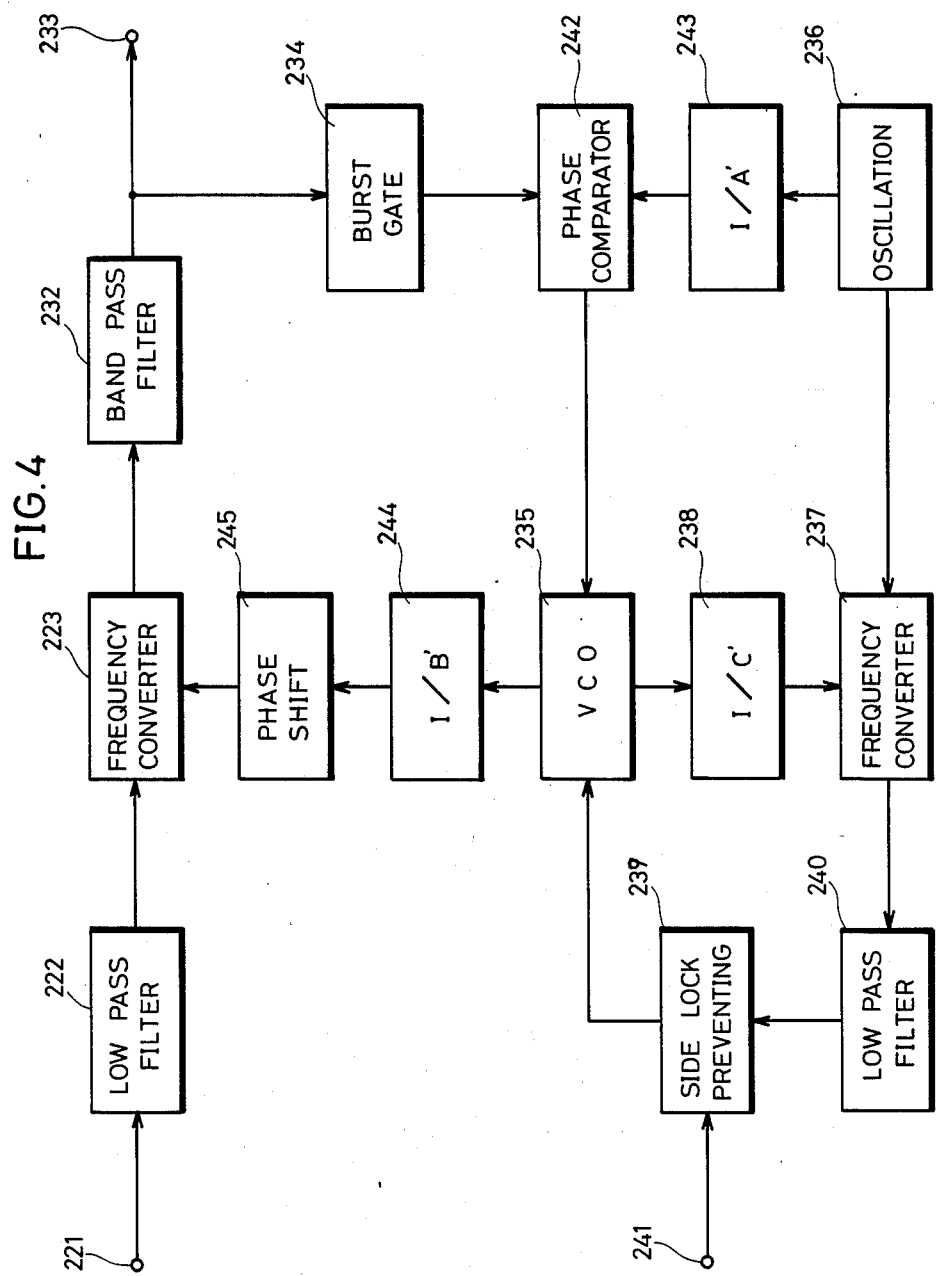
FIG. 4 is a circuit diagram showing a frequency converter for a VTR according to a second embodiment of the present invention.

FIG. 4 is a block diagram showing a frequency converter for a VTR according to a second embodiment of the present invention. The frequency converter shown in FIG. 4 converts a low-frequency converted chrominance signal of 629 KHz recorded on a tape into a carrier chrominance signal of 3.58 MHz.

Figure 2:
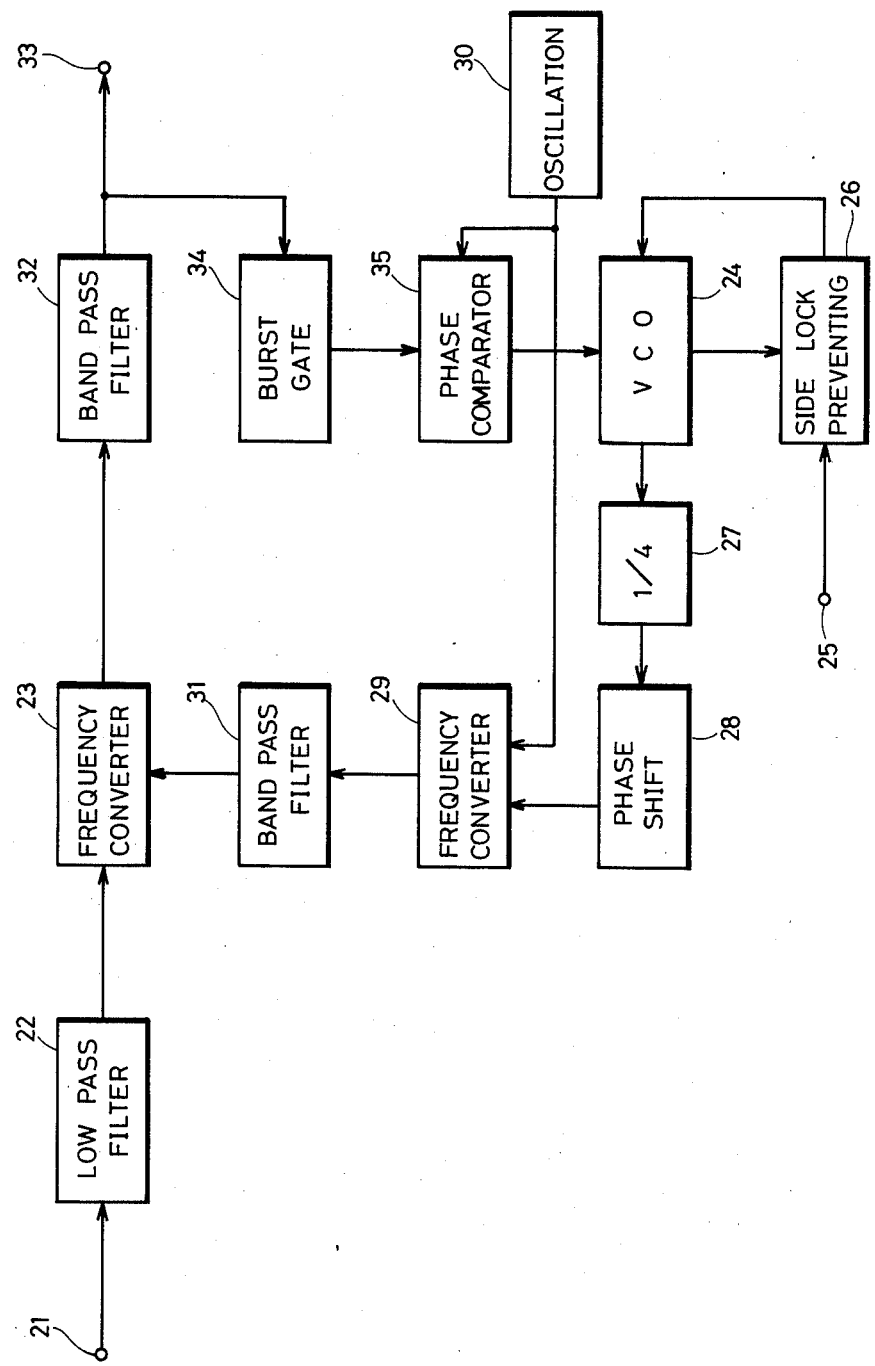
FIG. 2 is a circuit diagram showing an example of a frequency converter for converting a low-frequency converted signal of 629 KHz recorded on a tape into a carrier chrominance signal of 3.58 MHz at the time of reproduction in a conventional VTR.

In FIG. 4, an FM luminance signal and a low-frequency converted carrier chrominance signal reproduced from a tape are inputted to a terminal 221, and only the low-frequency converted chrominance signal of 629 KHz is extracted by a LPF 222 and applied to a first frequency converter 223. On the other hand, a VCO 235 oscillates at a frequency which is B' (B' is an integer) times a frequency which is the sum of the frequency 3.58 MHz of a carrier chrominance signal $f_S$ and the frequency 629 KHz of a low-frequency converted chrominance signal $f_{SL}$, of which an oscillating output signal $B' \cdot (f_S + f_{SL})$ is applied to a second frequency converter 237 through a 1/C' (C' is an integer) frequency divider 238. In addition, the oscillation circuit 236 oscillates at a frequency which is A' times the frequency of the carrier chrominance signal $f_S$, of which an oscillating output signal $A' \cdot f_S$ is applied to the second frequency converter 237, and a phase comparator circuit 242 through a 1/A' frequency divider 243. A signal having a frequency of the difference output of the two output signals $(B'/C') \cdot (f_S + f_{SL}) + A' \cdot f_S$ of the second frequency converter 237 is selected by LPF 240 to be applied to a side lock preventing circuit 239, which compares frequencies utilizing a reproduced horizontal synchronizing signal inputted from the terminal 241 as a reference signal, and generates an correcting voltage corresponding to the result and applies the same to a VCO 235. On the other hand, an output of the VCO 235 is applied to the first frequency converter 223 through a 1/B' frequency divider 244 and a phase shift circuit 245. An output of the first frequency converter 223 is applied to the BPF 232, in the same manner as the conventional example shown in FIG. 2, from which the carrier chrominance signal $f_S$ is extracted, outputted through an output terminal 233 and applied to a burst gate circuit 234. The burst gate circuit 234 extracts a burst signal in the carrier chrominance signal $f_S$ and applies the same to a phase comparator circuit 242. The phase comparator circuit 242 compares phases of an oscillating signal applied from the oscillation circuit 236 through the 1/A' frequency divider 243 and a burst signal applied from the burst gate circuit 234, and controls an oscillating output signal of the VCO 25 in response to a DC voltage corresponding to a phase difference therebetween.

Description is now made on operation according to the second embodiment shown in FIG. 4. The low-frequency converted chrominance signal $f_{SL}$ inputted from a terminal 221 is applied to the first frequency converter 223 through the LPF 222. On the other hand, an oscillating output signal B'·$(f_S+f_{SL})$ of the VCO 235 which oscillates at a frequency which is B' times the frequency which is the sum of the frequencies of the carrier chrominance signal $f_S$ and the low-frequency converted chrominance signal $f_{SL}$ is frequency-divided into 1/B' by the 1/B' frequency divider 244. As a result, a signal of $f_S+f_{SL}$ is applied to the first frequency converter 223 through a phase shift circuit 245.

Therefore, two signals of $(f_S+f_{SL})\pm f_{SL}$ appear in the output of the first frequency converter 223, and only the signal $f_S$ of a difference component therein passes through the BPF 232 and is applied to the burst gate circuit 234. The burst gate circuit 234 extracts only the burst signal in the carrier chrominance signal $f_S$ and applies the same to the phase comparator circuit 242. On the other hand, the phase comparator circuit 242, to which an oscillating output A'·$f_S$ of the oscillation circuit 236 is applied through the 1/A' frequency divider 243 as the signal $f_S$ frequency-divided into 1/A', compares phases of the signal $f_S$ and the above described burst signal. A voltage corresponding to the phase difference is fed back to the VCO 235, and the oscillating output signal of the VCO 235 is controlled such that the phase of the above described burst signal coincide with the phase of the oscillating output signal of the oscillation circuit 236. In addition, the oscillating output signal B'·$(f_S+f_{SL})$ of the VCO 235 is frequency-divided by the 1/C' frequency divider 238 to be a signal of (B'/C')·$(f_S+f_{SL})$ and applied to the second frequency converter 237. Furthermore, since the oscillating output signal of A'·$f_S$ is applied from the oscillation circuit 236 to the second frequency converter 237, the signals (B'/C')·$(f_S+f_{SL})\pm A'\cdot f_S$ are generated in an output of the second frequency converter 237. Assuming that the frequency dividing ratio of the frequency divider is A'=1, B'=C'=4, two signals of $(f_S+f_{SL})+f_S$ and $(f_S+f_{SL})-f_S$ are generated as output signals of the second frequency converter 237, and the signal of $f_{SL}$ therein is passed through the LPF 240 and applied to the side lock preventing circuit 239.

Since the phase comparator circuit 242 compares phases of a burst signal which intermittently arrives from the burst gate circuit 234 and a continuous wave which arrives from the oscillation circuit 236 and controls an oscillation frequency of the VCO 235, the oscillation frequency of the VCO 235 may be in an erroneous locked state (side locked state) which deviates, by an integer multiple of the frequency of the horizontal synchronizing signal, from the normal value. The side lock preventing circuit 239 corrects such a state. More specifically, the side lock preventing circuit 239 utilizes the reproduced horizontal synchronizing signal inputted from the terminal 241 as a reference signal, to compare frequencies of the signal $f_{SL}$ from the LPF 240 and the reference signal, and controls the VCO 235 in response to a voltage corresponding to the difference between the frequencies, so that the oscillation frequency of the VCO 235 is fixed to a predetermined value. The above described comparison of frequencies can be made by counting pulses of the signal $f_{SL}$ which arrives during a period of 4 H of the horizontal synchronizing signal.

As described in the foregoing, according to the circuit shown in FIG. 4, the low-frequency converted chrominance signal of 629 KHz inputted to the terminal 221 is converted into the carrier chrominance signal of 3.58 MHz and outputted from the terminal 233. In addition, according to the embodiment shown in FIG. 4, the oscillation circuit 236 for comparing phases is used in common for preventing side lock, so that the circuit structure can be simplified.

Figure 5:
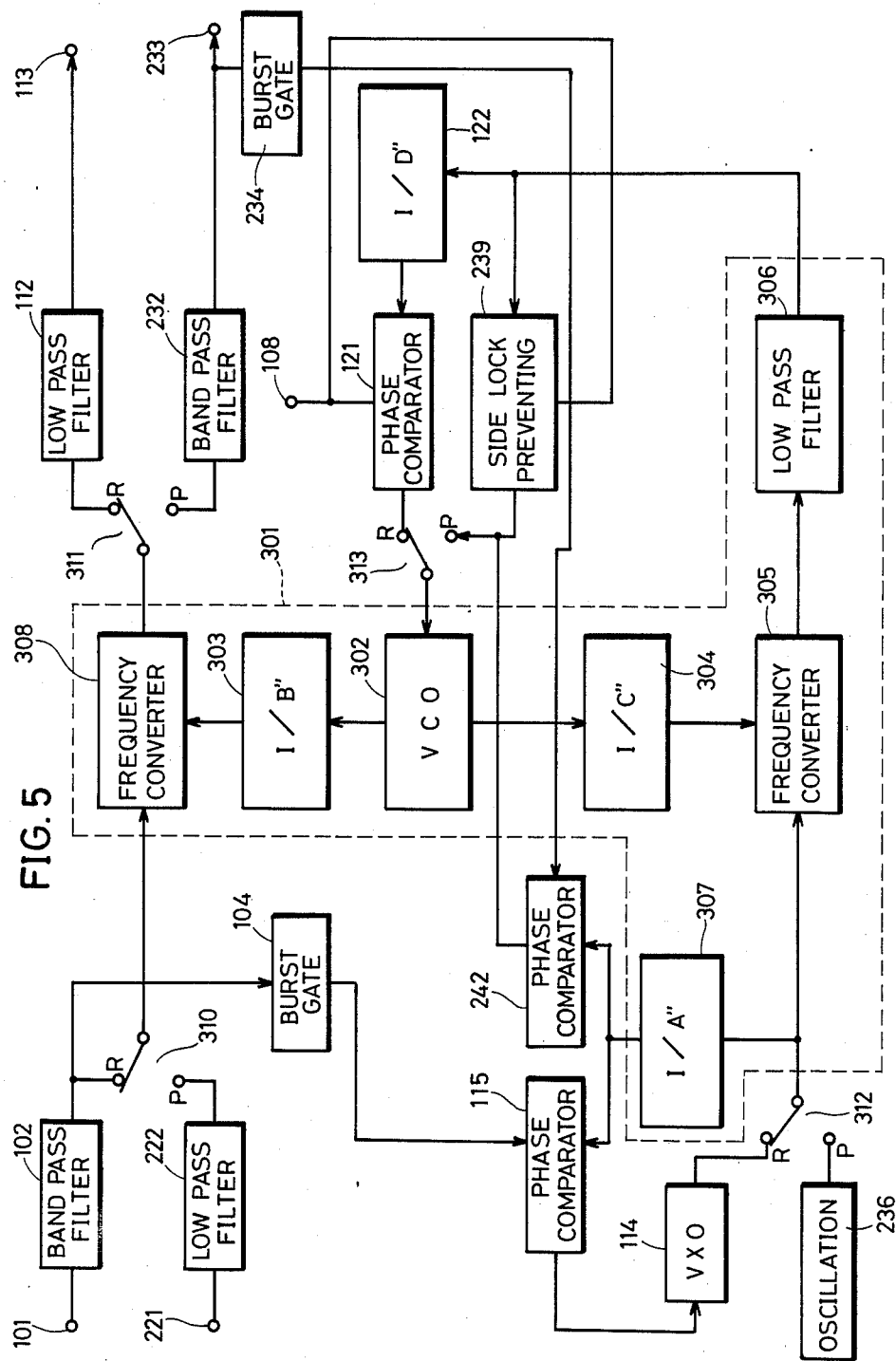
FIG. 5 is a circuit diagram showing a frequency converter for a VTR, according to a third embodiment of the present invention.

FIG. 5 is a block diagram showing a third embodiment of the present invention. A frequency converter shown in FIG. 5 uses components common to those in the first embodiment shown in FIG. 3 and the second embodiment shown in FIG. 4 for recording and reproduction in common so that a carrier chrominance signal of 3.58 MHz is low-frequency converted into a chrominance signal of 629 KHz at the time of recording and a low-frequency converted chrominance signal of 629 KHz is frequency converted into a carrier chrominance signal of 3.58 MHz at the time of reproduction.

In FIG. 5, the same components as those shown in FIGS. 3 and 4 have the same reference numerals and the description thereof is omitted. In addition, a portion 301 represented by a broken line in FIG. 5 is a group of components used for recording and reproduction in common. More specifically, a VCO 302 shown in FIG. 5 corresponds to the VCO 117 shown in FIG. 3 and the VCO 235 shown in FIG. 4, a 1/B" frequency divider and phase shift circuit 303 corresponds to the 1/B frequency divider 123 and the phase shift circuit 124 shown in FIG. 3 and the 1/B' frequency divider 244 and the phase shift circuit 245 shown in FIG. 4, a 1/C" frequency divider 304 corresponds to the 1/C frequency divider 119 shown in FIG. 3 and the 1/C' frequency divider 238 shown in FIG. 4, a second frequency converter 305 corresponds to the second frequency converter 118 shown in FIG. 3 and the frequency converter 237 shown in FIG. 4, an LPF 306 corresponds to the LPF 120 shown in FIG. 3 and the LPF 240 shown in FIG. 4, a 1/A" frequency divider 307 corresponds to the 1/A frequency divider 116 shown in FIG. 3 and the 1/A' frequency divider 243 shown in FIG. 4, and a first frequency converter 308 corresponds to the first frequency converter 103 shown in FIG. 3 and the first frequency converter 223 shown in FIG. 4.

Furthermore, switches 310, 311, 312 and 313 are controlled to be switched into contacts R at the time of recording and contacts P at the time of reproduction, respectively.

Description is now made on operation according to the embodiment shown in FIG. 5. At the time of recording, the switches 310, 311, 312 and 313 are switched to the contacts R, respectively. A carrier chrominance signal $f_S$ in a color video signal inputted to a terminal 101 is applied to the first frequency converter 308 and a burst gate circuit 104 through a BPF 102. The burst gate circuit 104 passes a burst signal in the applied carrier chrominance signal $f_S$ and applies the same to a first phase comparator circuit 115. On the other hand, an oscillating output signal $A''\cdot f_S$ of a VXO 114 which oscillates at a frequency which is $A''$ times the frequency of the carrier chrominance signal $f_S$ is frequency-divided by the $1/A''$ frequency divider 307 to be the signal $f_S$ and applied to a first phase comparator circuit 115. In the first phase comparator circuit 115, phases of the above described burst signal and the signal $f_S$ are compared, so that a DC voltage corresponding to a phase difference is fed back to the VXO 114. As a result, an oscillating output signal $A''\cdot f_S$ which is in synchronization with a signal having a frequency which is $A''$ times the frequency of the burst signal is obtained from the VXO 114 and applied to the second frequency converter 305.

On the other hand, an oscillating output signal $B''\cdot(f_S+f_{SL})$ of the VCO 302 which oscillates at a frequency which is $B''$ times a frequency which is the sum of the frequency of the carrier chrominance signal $f_S$ and a frequency of a low-frequency converted chrominance signal $f_{SL}$ is frequency-divided by the $1/C''$ frequency divider 304 to be a signal $(B''/C'')=(f_S+f_{SL})$ and applied to the second frequency converter 305. Signals having a frequency of the sum and a frequency of the difference of frequencies of the applied two signals appear in an output of the second frequency converter 305, so that signals $A''\cdot f_S\pm(B''/C'')\cdot(f_S+f_{SL})$ are generated in the output. Assuming that the frequency dividing ratio of the frequency divider is $A''=1$, $B''=C''=4$, $D''=40$, two signals of $f_S\pm(f_S+f_{SL})$ are generated as an output signal of the second frequency converter 305, from which a difference component, that is, the signal $f_{SL}$ is extracted through the LPF 306 and applied to a $1/D''$ frequency divider 122. The $1/D''$ frequency divider 122 applies the signal of $(1/40)\cdot f_{SL}$ (=15.74 KHz) to a second phase comparator circuit 121, which compares phases of the signal and a horizontal synchronizing signal serving as a reference signal. A DC voltage corresponding to a phase difference is fed back to the VCO 302. As a result, the VCO 302 is controlled such that phases of two input signals of the second phase comparator circuit 121 coincide with each other. An oscillating output signal $4\cdot(f_S+f_{SL})$ of the VCO 302 is applied to the $\frac{1}{4}$ frequency divider and phase shift circuit 303. When a signal of $4\cdot(f_S+f_{SL})=4\times 4.21$ MHz is applied to the circuit 303, the circuit 303 frequency-divides the signal into $\frac{1}{4}$ and generates output signals (4.21 MHz) which is shifted by 90° every 1 H. Thus, signals of $(f_S+f_{SL})\pm f_S$ appear in an output of the first frequency converter 308, and only the signal $f_{SL}$ of the difference component is extracted by the LPF 112 and outputted through the terminal 113. More specifically, according to the circuit shown in FIG. 5, the carrier chrominance signal $f_S$ of 3.58 MHz inputted to the terminal 101 at the time of recording is low-frequency converted into the chrominance signal $f_{SL}$ of 629 KHz and outputted from a terminal 113.

At the time of reproduction, the switches 310, 311, 312 and 313 are switched to the contacts P, respectively. The low-frequency converted signal $f_{SL}$ inputted from a terminal 221 is applied to the first frequency converter 308 through an LPF 222. On the other hand, the oscillating output signal $B''\cdot(f_S+f_{SL})$ of the VCO 302 which oscillates at a frequency which is $B''$ times the frequency which is the sum of the frequencies of the carrier chrominance signal $f_S$ and the low-frequency converted chrominance signal $f_{SL}$ is frequency-divided into $1/B''$ by the $1/B''$ frequency divider and phase shift circuit 303. As a result, the signal of $f_S+f_{SL}$ is applied to the first frequency converter 308. Thus, the two signals of $(f_S+f_{SL})\pm f_{SL}$ appear in the output of the first frequency converter 308, and only the difference component, that is, the signal $f_S$ is applied to a burst gate circuit 234 through a BPF 232. The burst gate circuit 234 extracts only the burst signal in the carrier chrominance signal $f_S$ and applies the same to a phase comparator circuit 242. On the other hand, the phase comparator circuit 242, to which the oscillating output $A''\cdot f_S$ of an oscillation circuit 236 is applied through the $1/A''$ frequency divider 307 as a signal $f_S$ frequency-divided into $1/A''$, compares the phases of the signal $f_S$ and the above described burst signal. A voltage corresponding to the phase difference is fed back to the VCO 302, of which an oscillating output signal is controlled such that the phase of the above described burst signal coincides with a phase of an oscillating output signal of an oscillation circuit 236. In addition, the oscillating output signal $B''\cdot(f_S+f_{SL})$ of the VCO 302 is frequency-divided by the $1/C''$ frequency divider 304 to be a signal of $(B''/C'')\cdot(f_S+f_{SL})$ and applied to the second frequency converter 305. Furthermore, since the oscillating output signal of $A''\cdot f_S$ is applied to the second frequency converter 305 from the oscillation circuit 236, signals of $(B''/C'')\cdot(f_S+f_{SL})\pm A''\cdot f_S$ are generated in an output terminal of the second frequency converter 305. Since the frequency dividing ratio of the frequency divider is $A''=1$, $B''=C''=4$ as described above, the two signals of $(f_S+f_{SL})+f_S$ and $(f_S+f_{SL})-f_S$ are generated as output signals of the second frequency converter 305, and the signal $f_S$ therein is passed through the LPF 306 and applied to a side lock preventing circuit 239. The side lock preventing circuit 239 utilizes a reproduced horizontal synchronizing signal inputted from a terminal 108 as a reference signal to compare frequencies of the signal $f_{SL}$ from the LPF 306 and the reference signal, and controls the VCO 302 in response to a voltage corresponding to a frequency difference, so that an oscillation frequency of the VCO 302 is fixed to a predetermined value.

As described in the foregoing, according to the circuit shown in FIG. 5, at the time of reproduction, the low-frequency converted chrominance signal of 629 KHz inputted to the terminal 221 is converted into the carrier chrominance signal of 3.58 MHz, and outputted from a terminal 233.

Figure 6:
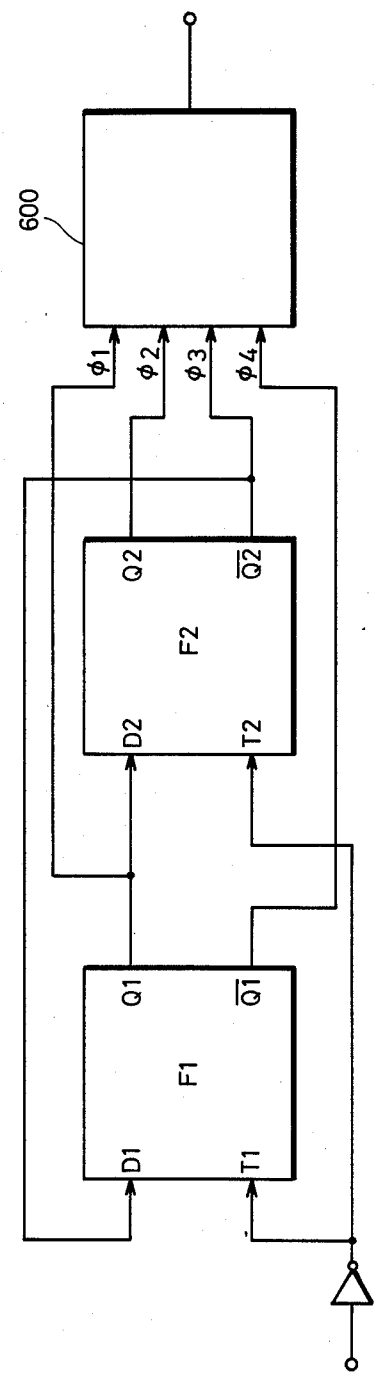
FIG. 6 is a block diagram showing an example of a 1/B frequency divider and a phase shift circuit shown in FIG. 5.
Figure 7:
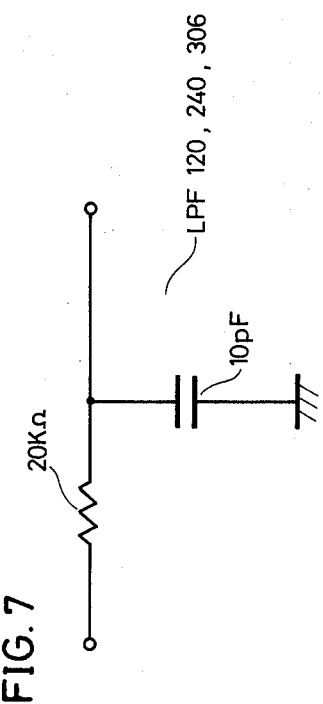
FIG. 7 is a circuit diagram showing a low pass filter shown in FIGS. 3 to 5.

The $\frac{1}{4}$ frequency divider and phase shift circuit 303 can comprise two D type flip-flops F1 and F2 as shown in FIG. 6 so that signals $\phi_1$ to $\phi_4$ which are out of phase by 90° outputted from the flip-flops are sequentially selected by a selecting circuit 600 and outputted.

Additionally, the LPF 120 shown in FIG. 3, the LPF 204 shown in FIG. 4 and the LPF 306 shown in FIG. 5 extract the signal $f_{SL}$ from the signals $(f_S+f_{SL})\pm f_S$, respectively. Since a frequency of the signal $2f_S+f_{SL}$ is 7.789 MHz and the frequency of the signal $f_{SL}$ is 629 KHz which are sufficiently different from each other, the LPFs can comprise a resistor having small resistance and a capacitor having small capacitance. For example, assuming that resistance is 20 KΩ when a cut-off frequency of the LPF is set to 5 MHz, capacitance of the capacitor may be 10 pF:

$$\begin{aligned}\tau &= CR \\ &= 10 \text{ pF} \times 20\text{K}\Omega \\ &= 2\times 10^{-7} s\end{aligned}$$

-continued therefore, $$f = 1/\tau$$
$$= 1/(2 \times 10^{-7})$$
$$= 5 \text{ MHz}$$

If capacitance is about 10 pF, the capacitor can be formed by utilizing capacitance of a nitride film or capacitance of junction, so that an integrated circuit can be easily formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frequency converter for a video tape recorder for converting a carrier chrominance signal in a video signal into a low-frequency signal comprising:
   means (102) for extracting a carrier chrominance signal having a first frequency from the video signal and supplying the same, said carrier chrominance signal including a burst signal,
   voltage controlled oscillator means (117, 119, 123, 124) for supplying a signal having a third frequency which is the sum of said first frequency and a second frequency which is lower than said first frequency and predetermined times a frequency of a horizontal synchronizing signal in said video signal,
   first frequency converting means (103, 112) for supplying a chrominance signal as low-frequency converted into said second frequency, in response to said supplied carrier chrominance signal having the first frequency and the signal having the third frequency supplied from said voltage controlled oscillator means,
   oscillator means (114, 115, 116) for supplying a signal having a predetermined frequency which is in synchronization with the burst signal in said carrier chrominance signal having the first frequency,
   second frequency converting means (118, 120, 122) for supplying a signal including a signal component having said second frequency in response to the signal having the third frequency supplied from said voltage controlled oscillator means and the signal having a predetermined frequency supplied from said oscillator means, and
   first phase comparing means (121) for comparing phases of an output of said second frequency converting means and the horizontal synchronizing signal in said video signal and controlling said voltage controlled oscillator means so that the phases coincide with each other.

2. A frequency converter in accordance with claim 1, wherein
said second frequency converting means comprises
   converting means (118) for supplying signals having a frequency of the sum and a frequency of the difference of the output of said oscillator means and an output of said voltage controlled oscillator means, and
   first filter means (120) for passing only the signal having the frequency of the difference in the signals having the frequency of the sum and the frequency of the difference.

3. A frequency converter in accordance with claim 2, wherein
said oscillator means comprises
   a first oscillator (114) for supplying a signal having a frequency which is A (A is an integer) times said first frequency,
   a first frequency divider (116) for frequency-dividing an output of said first oscillator into 1/A, and
   second phase comparing means (115) for comparing phases of an output of said first frequency divider and the burst signal in said carrier chrominance signal and controlling said first oscillator so that the phases coincide with each other.

4. A frequency converter in accordance with claim 3, wherein,
said voltage controlled oscillator means comprises
   a second oscillator (117) for supplying a signal having a frequency which is B (B is an integer) times said third frequency,
   a second frequency divider (123) for frequency-dividing an output of said second oscillator into 1/B,
   phase shifting means (124) for shifting a phase of an output of said second frequency divider and applying the same to said first frequency converting means, and
   third frequency divider (119) for frequency-dividing the output of said second oscillator into 1/C (C is an integer) and applying the same to said second frequency converting means.

5. A frequency converter in accordance with claim 4, wherein
said first frequency converting means comprises
   converting means (103) for supplying signals having a frequency of the sum and a frequency of the difference of said carrier chrominance signal having the first frequency and the signal having the third frequency applied from said phase shifting means,
   second filter means (112) for passing only a signal having the frequency of the difference in the signals having the frequency of the sum and the frequency of the difference.

6. A frequency converter for a video tape recorder for converting a low-frequency converted chrominance signal recorded on a tape into a carrier chrominance signal, comprising:
   means (222) for extracting a low-frequency converted chrominance signal having a first frequency and supplying the same, said first frequency being predetermined times a frequency of a reproduced horizontal synchronizing signal,
   voltage controlled oscillator means (235, 238, 244, 245) for supplying a signal having a third frequency which is the sum of said first frequency and a second frequency which is higher than said first frequency,
   first frequency converting means (223, 232) responsive to said supplied low-frequency converted chrominance signal having the first frequency and the signal having the third frequency supplied from said voltage-controlled oscillator means for supplying a carrier chrominance signal as frequency-converted into said second frequency, said carrier chrominance signal including a burst signal
   oscillator means (236, 243) for supplying a signal having a predetermined frequency associated with said second frequency, second frequency converting means (237, 240) responsive to the signal having the third frequency supplied from said voltage controlled oscillator means and the signal having a predetermined frequency supplied from said oscillator means for supplying a signal including a signal component having the first frequency, phase comparing means (242) for comparing phases of the burst signal in said carrier chrominance signal having the second frequency and a signal having a predetermined frequency supplied from said oscillator means and controlling said voltage controlled oscillator means so that the phases coincide with each other, and frequency controlling means (239) for comparing frequencies of an output of said second frequency converting means and said reproduced horizontal synchronizing signal and controlling said voltage controlled oscillator means based on the difference.

7. A frequency converter in accordance with claim 6, wherein
said second frequency converting means comprises
converting means (237) for applying signals having the frequency of the sum and the frequency of the difference of the output of said oscillator means and the output of said voltage controlled oscillator means, and
first filter means (240) for passing only the signal having the frequency of the difference in the signals having said frequency of the sum and said frequency of difference.

8. A frequency converter in accordance with claim 7, wherein
said oscillator means comprises
a first oscillator (236) for supplying a signal having a frequency which is A' (A' is an integer) times said second frequency,
a first frequency divider (243) for frequency dividing the output of said first oscillator into 1/A' and applying the same to said phase comparing means.

9. A frequency converter in accordance with claim 8, wherein,
said voltage controlled oscillator means comprises
a second oscillator (235) for supplying a signal having a frequency which is B' (B' is an integer) times said third frequency,
a second frequency divider (244) for frequency-dividing the output of said second oscillator into 1/B',
phase shifting means (245) for shifting the phase of an output of said second frequency divider and applying the same to said first frequency converting means, and
a third frequency divider (238) for frequency-dividing the output of said second oscillator into 1/C' (C' is an integer) and applying the same to said second frequency converting means.

10. A frequency converter in accordance with claim 9, wherein
said first frequency converting means comprises
converting means (223) for applying signals having a frequency of the sum and a frequency of the difference of said low-frequency converted chrominance signal having the first frequency and the signal having the third frequency applied from said phase deviating means, and
first filter means (232) for passing only the signal having the frequency of the difference in said frequency of the sum and said frequency of the difference.

11. A frequency converter for a video tape recorder, comprising:
means (102) for extracting a carrier chrominance signal having a first frequency from a video signal, said carrier chrominance signal including a burst signal,
means (222) for extracting a low-frequency converted chrominance signal recorded on a tape having a second frequency which is lower than said first frequency, said second frequency being predetermined times a frequency of a horizontal synchronizing signal in the video signal,
first selecting means (310) for selecting the carrier chrominance signal having said first frequency at the time of recording and selecting the low-frequency converted chrominance signal having said second frequency at the time of reproduction,
voltage controlled oscillator means (302) for supplying a signal having a third frequency which is the sum of said first frequency and said second frequency,
first frequency converting means (308) responsive to the chrominance signal selected by said first selecting means and the signal having the third frequency supplied from said voltage controlled oscillator means for supplying the chrominance signal low-frequency converted into said second frequency at the time of recording and supplying the carrier chrominance signal as frequency-converted into the first frequency at the time of reproduction,
first oscillator means (114) for generating a signal having a predetermined frequency which is in synchronization with the burst signal having said first frequency,
second oscillator means (236) for supplying a signal having a predetermined frequency associated with said first frequency,
second selecting means (312) for selecting an output of said first oscillator means at the time of recording and selecting an output of said second oscillator means at the time of reproduction,
second frequency converting means (305) responsive to the signal having the third frequency supplied from said voltage controlled oscillator means and a signal selected by said second selecting means for supplying a signal including a signal component having said second frequency,
first phase comparing means (121) for comparing an output of said second frequency converting means and the horizontal synchronizing signal in said video signal and supplying an output to control said voltage controlled oscillator means so that the phases coincide with each other,
second phase comparing means (242) for comparing phases of the burst signal in the carrier chrominance signal having the first frequency supplied from said first frequency converting means at the time of reproduction and the signal having a predetermined frequency supplied from said second oscillator means and supplying an output to control said voltage controlled oscillator means so that the phases coincide with each other,
frequency controlling means (239) for comparing frequencies of an output of said second frequency converting means and said horizontal synchronizing signal and supplying the output to control said voltage controlled oscillator means based on the difference, and third selecting means (313) for applying the output of said first phase comparing means to said voltage controlled oscillator means at the time of recording and applying the outputs of said second phase comparing means and said frequency controlling means to said voltage controlled oscillator means at the time of reproduction.

12. A frequency converter in accordance with claim 11, wherein
said second frequency converting means comprises
converting means for applying signals having a frequency of the sum and a frequency of the difference of a signal selected by said second selecting means and an output of said voltage controlled oscillator means, and
first filter means for passing only the signal having the frequency of the difference in the signals having said frequency of the sum and said frequency of the difference.

13. A frequency converter in accordance with claim 12, wherein
said first oscillator means comprises
a first oscillator for supplying a signal having a frequency which is A" (A" is an integer) times said first frequency,
a first frequency divider for frequency-dividing an output of said first oscillator into 1/A", and
third phase comparing means for comparing phases of an output of said first frequency divider and a burst signal in said carrier chrominance signal and supplying an output to control said first oscillator so that the phases coincide with each other.

14. A frequency converter in accordance with claim 12, wherein
said second oscillator means comprises a second oscillator for supplying a signal having the frequency which is A" times said first frequency, and
second frequency divider for frequency-dividing an output of said second oscillator into 1/A" and applying the same to said second phase comparing means.

15. A frequency converter in accordance with claim 12, wherein
said voltage controlled oscillator means comprises
a third oscillator for outputting a signal having a frequency which is B" (B" is an integer) times said third frequency,
a third frequency divider for frequency-dividing an output of said third oscillator into 1/B",
phase shifting means for shifting a phase of an output of said third frequency divider and applying the same to said first frequency converting means, and
a fourth frequency divider for frequency-dividing the output of said third oscillator into 1/C" (C" is an integer) and applying the same to said second frequency converting means.

16. A frequency converter in accordance with claim 15, wherein
said first frequency converting means comprises
converting means for applying signals having a frequency of the sum and a frequency of the difference of the chrominance signal selected by said first selecting means and the signal having the third frequency applied from said third frequency divider, and
second filter means for passing only the signal having the frequency of the difference in said signals having said frequency of the sum and said frequency of the difference at the time of recording and third filter means for passing the same at the time of reproduction.

17. A frequency converter in accordance with claim 15, wherein
said third frequency divider and said phase shifting means comprises two D type flip-flops.

* * * * *